UNITED STATES PATENT OFFICE.

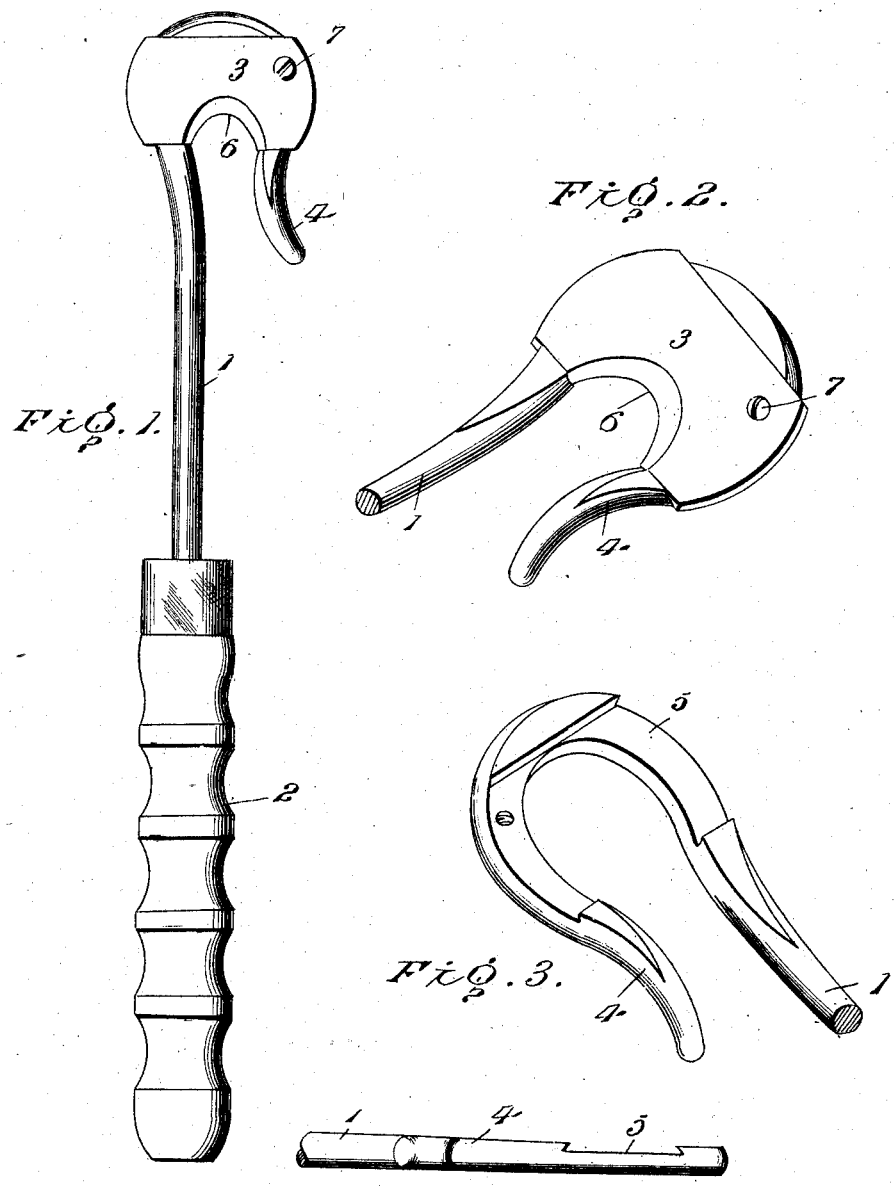

IRVILLE L. SANDERS, OF GILROY, CALIFORNIA.

GRAPE-CUTTER.

No. 866,308.   Specification of Letters Patent.   Patented Sept. 17, 1907.

Application filed February 2, 1907. Serial No. 355,480.

*To all whom it may concern:*

Be it known that I, IRVILLE L. SANDERS, a citizen of the United States, residing at Gilroy, in the county of Santa Clara and State of California, have invented certain new and useful Improvements in Grape-Cutters, of which the following is a specification.

This invention has relation to a cutter, or implement designed primarily for removing bunches of grapes from the vine and which may be used generally for cutting the stems of fruit when gathering the same, thereby obviating injury both to the fruit and the vine, tree, bush or the like upon which the fruit to be gathered may be grown.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view of an implement embodying the invention. Fig. 2 is a perspective view of the cutting end of the implement showing the same on a larger scale. Fig. 3 is a perspective view of the hook, the cutter being omitted. Fig. 4 is an edge view of the hook end of the cutter showing more clearly the dove-tail joint between the hook and cutter, whereby displacement of the latter is prevented.

Corresponding and like parts are referred to in the following description and indicated in all the views of the drawings by the same reference characters.

The implement comprises a stem 1, handle 2 and cutter 3. The stem 1 consists of a rod, or stout wire, and is provided at one end with the handle 2 and at its opposite end with a hook 4, the same being formed by bending an end portion of the stem upon itself into the shape substantially as shown. The closed end of the hook is flattened and a seat 5 is formed in one side by depressing, or cutting away a portion of the shank and bill of the hook adjacent to the butt or closed end. The opposite edges of the seat are under-cut so as to engage over bevel edges of the cutter 3 and prevent outward displacement of the cutter after the same has been slipped into the seat 5. The extremity of the bill is curved outward from the stem to provide a flaring entrance to the hook to guide the stems of the fruit to the cutter when the implement is in use.

The cutter 3 consists of a steel blade comparatively thin and wide and of a length to project slightly beyond the bill and shank of the hook. The cutter is of a width to snugly fit between opposite edges of the seat 5 and the longitudinal edges of the cutter are beveled to fit under the overhanging portions of the edges at opposite sides of the seat 5. A notch 6 is formed in the front edge of the cutter and faces the entrance to the hook and the portion bordering upon the notch is beveled to a keen edge so as to sever the stems by a clean cut. A screw, or like fastening 7, passes through an opening near one end of the cutter and is let into a threaded opening in a member of the hook and prevents longitudinal movement of the cutter, and in conjunction with the beveled edges of the cutter and under-cut edges of the seat 5, holds said cutter in place.

The handle 2 may be secured to the stem 1 in any manner and is preferably of wood and is formed in its outer side with a series of annular depressions in which the fingers may obtain a firm hold to prevent possible slipping when the implement is in operation.

Having thus described the invention, what is claimed as new is:

1. A cutting implement comprising a stem having a hook at one end and having a depression in one side of the hook to form a seat, and having opposite edges of the seat under-cut, a cutter having opposite edges beveled to engage under the overhanging portions of the under-cut edges of the aforementioned seat in which said cutter is fitted and means for securing the cutter to the hook.

2. A cutting implement comprising a hook and having its body portion flattened and provided in one side with a seat, opposite edges of which are under-cut, a cutter fitted in said seat and having opposite edges beveled to fit the under-cut edges of the aforesaid seat, and means for securing the cutter to the hook.

3. The herein described cutting implement comprising a stem provided at one end with a handle and having a hook at its opposite end, the body portion of the hook being flattened and provided in one side with a seat, opposite edges of which are under-cut, a cutter having a notch in one edge and having the portion bordering upon the notch beveled to a keen edge, said cutter being fitted in the aforesaid seat, and means for securing the cutter to the hook.

In testimony whereof I affix my signature in presence of two witnesses.

IRVILLE L. SANDERS. [L. S.]

Witnesses:
 C. H. EMLEN,
 STEPHEN BARKER.